Nov. 16, 1943.     W. I. GUM     2,334,260
VEHICLE TIRE
Filed April 14, 1943     3 Sheets-Sheet 1

Inventor
Wallace I. Gum

By Clarence A. O'Brien
and Harvey B. Jacobson
Attorneys

Nov. 16, 1943.  W. I. GUM  2,334,260
VEHICLE TIRE
Filed April 14, 1943  3 Sheets-Sheet 2
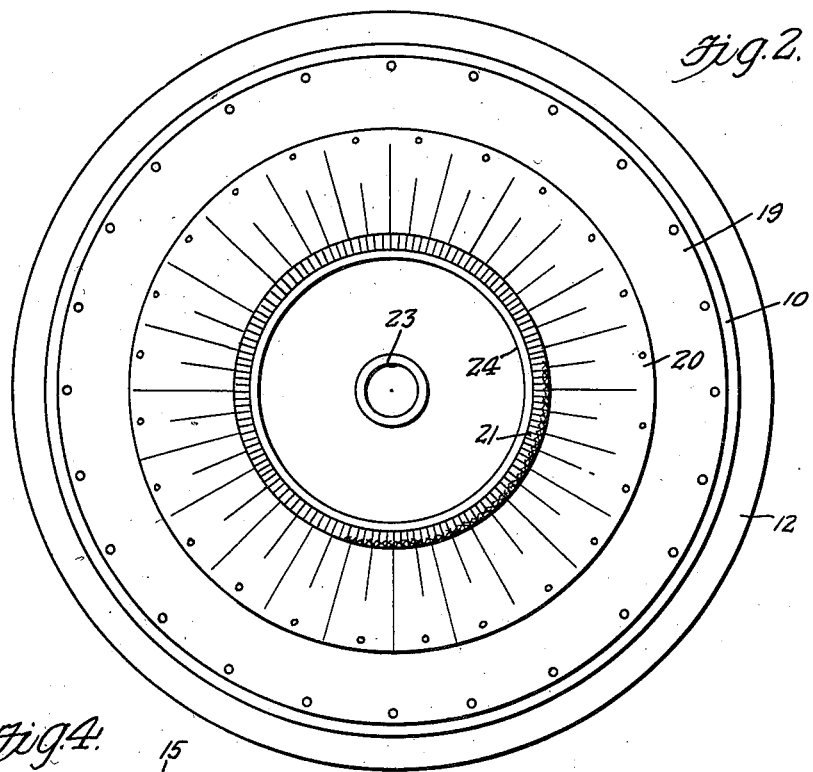
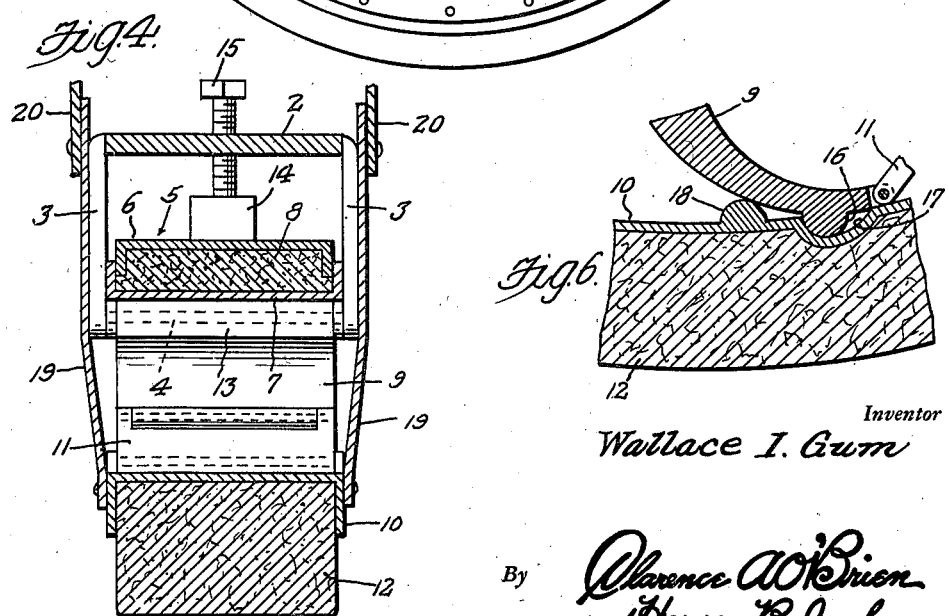
Inventor
Wallace I. Gum
By Clarence A. O'Brien
and Harvey B. Jacobson
Attorneys Nov. 16, 1943.　　　　W. I. GUM　　　　2,334,260
VEHICLE TIRE
Filed April 14, 1943　　　3 Sheets-Sheet 3

Inventor
Wallace I. Gum

By Clarence A. O'Brien
and Harvey B. Jacobson
Attorneys

Patented Nov. 16, 1943

2,334,260

UNITED STATES PATENT OFFICE 2,334,260

VEHICLE TIRE

Wallace I. Gum, Laredo, Tex.

Application April 14, 1943, Serial No. 483,010

3 Claims. (Cl. 152—52)

The present invention relates to new and useful improvements in vehicle tires and has for its primary object to provide, in a manner as hereinafter set forth, novel mechanical means for floatingly supporting a vehicle without the use of air, springs, etc., whereby maximum riding comfort will be had.

Another very important object of the invention is to provide a vehicle tire of the aforementioned character which is adapted to be adjusted for different loads.

Other objects of the invention are to provide a vehicle tire of the character described which will be comparatively simple in construction, strong, durable, reliable in use and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein—

Figure 2 is an elevational view looking at the inner side of the tire.

Figure 4 is a cross sectional view, taken substantially on the line 4—4 of Figure 1.

Figure 6 is a fragmentary view in vertical section through an outer portion of the tire, taken substantially on the line 6—6 of Figure 5.

Figure 1:
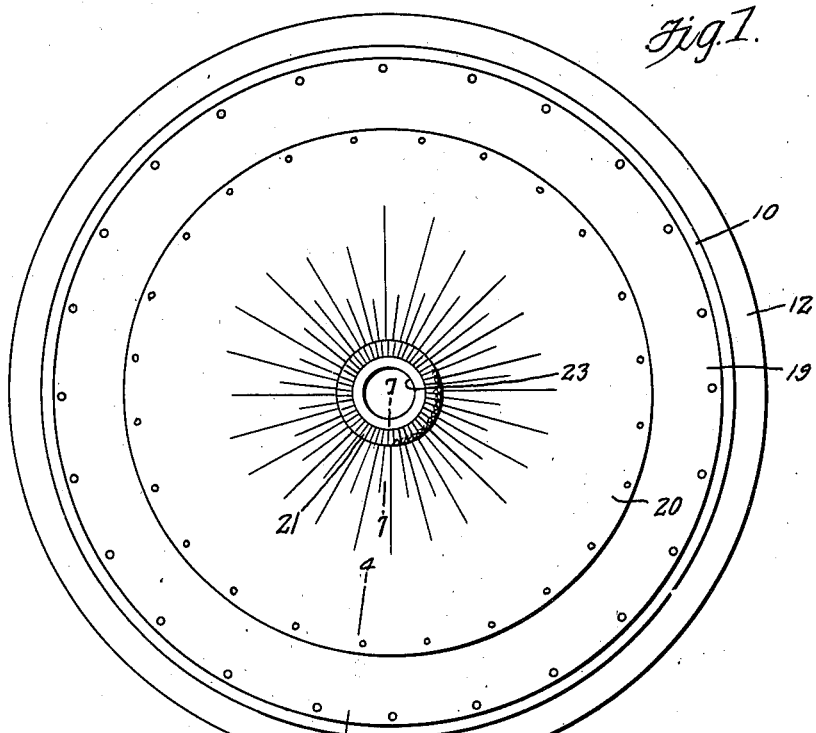
Figure 1 is an elevational view of a vehicle tire constructed in accordance with the present invention, looking at the outer side thereof.
Figure 5:
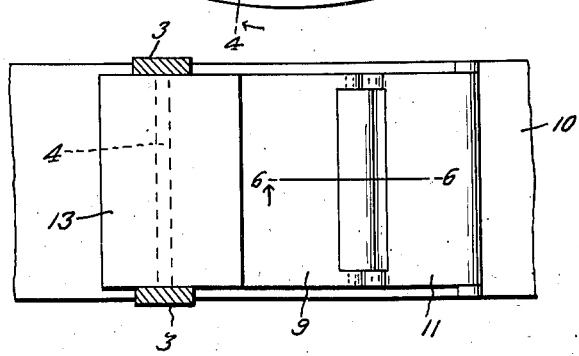
Figure 5 is a fragmentary view in section, taken substantially on the line 5—5 of Figure 3.

Referring now to the drawings in detail, it will be seen that reference numeral 1 designates generally a suitable wheel comprising a felly 2. Pairs of arms 3 radiate from the felly 2. Pins 4 extend between the outer end portions of the pairs of arms 3.

Mounted between the pairs of arms 3 in spaced, concentric relation to the felly 2 is an annular cushion member which is designated generally by reference numeral 5. As illustrated to advantage in Figure 4 of the drawings, the annular cushion member 5 comprises opposed, telescopic rings 6 and 7 of substantially channel-shaped cross section. The rings 6 and 7 receive therebetween a suitable compressible cushioning element 8.

Arcuate levers 9 are journaled for swinging movement on the pins 4. The free or outer ends of the levers 9 are connected to a rim 10 through the medium of toggles 11. The rim 10 has mounted thereon a suitable tread 12.

Formed integrally with the pivoted inner end portions of the levers 9 are angularly projecting cams 13 which are engaged with the annular cushion member 5. Thus, inward swinging movement of the levers 9 is yieldingly resisted by the annular cushion 5. Substantially segmental elements 14 are mounted circumferentially on the inner periphery of the cushion ring 7. Adjusting bolts 15 are threadably mounted in the felly 2 and engaged with the elements 14 for supporting the annular cushion 5 on the felly 2 and for regulating the resiliency of said cushion member.

The levers 9 are provided, on their outer end portions, with transversely extending, substantially segmental fulcrums 16 which are rockable and slidable in pockets 17 which are provided therefor in the rim 10. The outer end portions of the levers 9 are also operable on fulcrums 18 which are provided therefor on the rim 10 adjacent the pockets 17.

Figure 7:
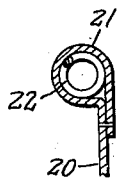
Figure 7 is a detail view in section through the inner portion of one of the protective covers or shields, taken substantially on the line 7—7 of Figure 1.
Figure 3:
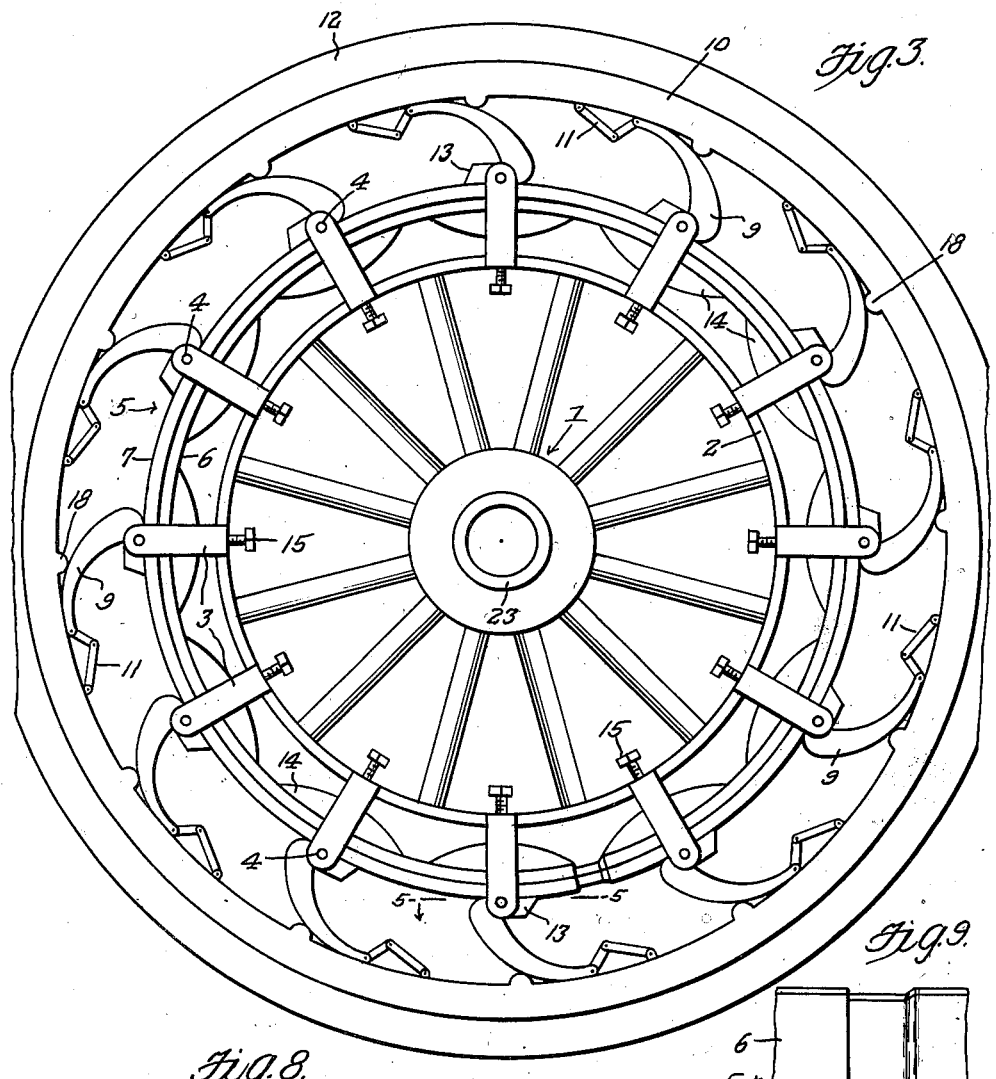
Figure 3 is a view in side elevation of the tire with the protective side covering removed.
Figure 8:
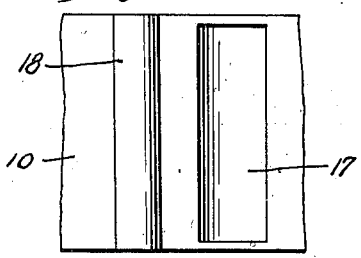
Figure 8 is a fragmentary view of a portion of the rim, looking at the inner periphery thereof.
Figure 9:
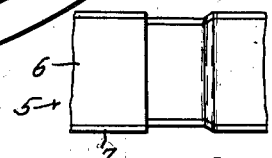
Figure 9 is a detail view showing the connection between the ends of the cushion ring.

Flat metallic side rings 19 are fixed on the rim 10 for movement therewith. Annular covers 20 of suitable flexible material have their outer marginal portions secured to the inner marginal portions of the rings 19. The covers 20 are gathered and provided on their inner edges with hems or the like 21 (see Figure 7) for the reception of endless coil springs 22. The coil springs 22 provide means for securing the flexible covers 20 around the hub 23 and the brake drum 24 of the wheel 1.

It is thought that the operation of the invention will be readily apparent from a consideration of the foregoing. Briefly, the pivoted levers 9 floatingly support the wheel 1 in the rim 10. When the levers 9 are swung inwardly, or toward the wheel 1, under the weight of the load, such movement is yieldingly resisted by the annular cushion member 5. As the levers 9 are swung inwardly the cushioning element 8 is compressed between the rings 7 and 6. As hereinbefore stated, through the medium of the adjusting bolts 15, the cushioning element 8 may be compressed as desired to regulate the resistance thereof to the levers 9.

It is believed that the many advantages of a vehicle tire constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

Having described the invention, what is claimed as new is:

1. A vehicle tire comprising a felly, pairs of arms radiating from said felly, an annular cushion member mounted between the pairs of arms in spaced relation to the felly and encircling the same, levers pivotally mounted between the pairs of arms, a rim mounted on the free end portions of the levers, and cams on the pivoted ends of the levers engaged with the annular cushion, said annular cushion constituting means for yieldingly resisting inward swinging movement of the levers.

2. A vehicle tire comprising a felly, pairs of arms radiating from said felly, an annular cushion member encircling the felly in spaced relation thereto and mounted between the pairs of arms, levers pivotally mounted between the pairs of arms outwardly of the annular cushion member, a rim mounted on the levers, cams on the pivoted ends of the levers engaged with the annular cushion member, and bolts threadedly mounted in the felly and engaged with the annular cushion member for adjusting the same relative to the cams.

3. A vehicle tire comprising a felly, pairs of arms radiating from the felly, an annular cushion member between the pairs of arms encircling the felly in spaced, concentric relation thereto, pins extending between the arms outwardly of the annular cushion member, levers having one end portion journaled on the pins, a rim encircling the annular cushion member in spaced relation thereto, toggles connecting the levers to said rim, a tread on the rim, cams on the pivoted ends of the levers engaged with the annular cushion member, said annular cushion member constituting means for yieldingly resisting inward swinging movement of the levers, and bolts threadedly mounted in the felly and engaged with the annular cushion member for supporting the same on the felly and for adjusting said annular cushion member relative to the cams.

WALLACE I. GUM.